(12) United States Patent
Strano et al.

(10) Patent No.: US 8,568,685 B2
(45) Date of Patent: Oct. 29, 2013

(54) SEPARATION OF NANOSTRUCTURES

(75) Inventors: Michael S. Strano, Lexington, MA (US); Woo-Jae Kim, Seoul (KR)

(73) Assignee: Massachusetts Institute of Technology, Cambridge, MA (US)

( * ) Notice: Subject to any disclaimer, the term of this patent is extended or adjusted under 35 U.S.C. 154(b) by 369 days.

(21) Appl. No.: 12/743,912

(22) PCT Filed: Nov. 21, 2008

(86) PCT No.: PCT/US2008/012980
§ 371 (c)(1),
(2), (4) Date: Sep. 3, 2010

(87) PCT Pub. No.: WO2009/070240
PCT Pub. Date: Jun. 4, 2009

(65) Prior Publication Data
US 2011/0011773 A1      Jan. 20, 2011

Related U.S. Application Data

(60) Provisional application No. 61/004,009, filed on Nov. 21, 2007.

(51) Int. Cl.
*D01F 9/12* (2006.01)
(52) U.S. Cl.
USPC ............. 423/447.1; 209/7; 423/460; 252/502
(58) Field of Classification Search
USPC ............ 209/7, 139.2, 199; 204/164; 210/634; 423/447.1
See application file for complete search history.

(56) References Cited

U.S. PATENT DOCUMENTS

| | | | |
|---|---|---|---|
| 7,247,670 B2 | 7/2007 | Malenfant et al. | |
| 7,662,298 B2 * | 2/2010 | Hersam et al. | 210/781 |
| 7,727,505 B2 * | 6/2010 | Afazali-Ardakani et al. | 423/460 |
| 7,939,047 B2 * | 5/2011 | Tour et al. | 423/460 |
| 2004/0040834 A1 * | 3/2004 | Smalley et al. | 204/164 |
| 2004/0232073 A1 | 11/2004 | Papadimitrakopoulos | |
| 2006/0165586 A1 * | 7/2006 | Wong et al. | 423/447.1 |
| 2006/0278579 A1 | 12/2006 | Choi et al. | |
| 2007/0117150 A1 | 5/2007 | Jagota et al. | |
| 2007/0125707 A1 | 6/2007 | Komatsu et al. | |
| 2008/0063587 A1 | 3/2008 | Strano et al. | |

(Continued)

FOREIGN PATENT DOCUMENTS

| | | |
|---|---|---|
| KR | 10-2006-0090654 A | 8/2006 |
| KR | 10-2007-0049179 A | 5/2007 |

(Continued)

OTHER PUBLICATIONS

Arnold, M., et al., "Enrichment of Single-Walled Carbon Nanotubes by Diameter in Density Gradients", Nano Letters, 2005, vol. 5, No. 4, pp. 713-718.

(Continued)

*Primary Examiner* — Terrell Matthews
(74) *Attorney, Agent, or Firm* — Steptoe & Johnson LLP

(57) ABSTRACT

The present invention generally relates to the separation of one or more populations of nanostructures from one or more other populations of nanostructures based upon differences in density. An overall mixture of very similar or identical nanostructures may be exposed to a set of conditions under which one population of the nanostructures is affected differently than the other, allowing separating on the basis of differences in density.

19 Claims, 3 Drawing Sheets

(56) References Cited

U.S. PATENT DOCUMENTS

| | | |
|---|---|---|
| 2008/0213159 A1 | 9/2008 | Sandhu |
| 2008/0217588 A1* | 9/2008 | Arnold et al. ............... 252/502 |
| 2008/0260616 A1 | 10/2008 | Tour et al. |
| 2009/0075157 A1* | 3/2009 | Pak et al. ...................... 429/44 |
| 2009/0291041 A1* | 11/2009 | Afzali-Ardakani et al. ...................... 423/447.1 |
| 2010/0111814 A1* | 5/2010 | Doorn et al. ............... 423/447.1 |
| 2010/0117034 A1 | 5/2010 | Han et al. |

FOREIGN PATENT DOCUMENTS

| | | |
|---|---|---|
| KR | 10-2007-0079744 A | 8/2007 |
| WO | WO 2005-012172 A2 | 2/2005 |
| WO | WO 2006-096200 A1 | 9/2006 |
| WO | WO 2006/096613 A2 | 9/2006 |
| WO | WO 2007/130869 A2 | 11/2007 |
| WO | WO 2008/057108 A2 | 5/2008 |

OTHER PUBLICATIONS

Arnold, M., et al., "Sorting carbon nanotubes by electronic structure using density differentiation", Nature Nanotechnology, 2006, vol. 1, pp. 60-65.

Avouris, P., "Molecular Electronics with Carbon Nanotubes", Acc. Chem. Res., 2002, vol. 35, pp. 1026-1034.

Baik, S., et al., "Using the Selective Functionalization of Metallic Single-Walled Carbon Nanotubes in Control Dielectrophoretic Mobility", J. Phys. Chem, B, 2004, vol. 108, pp. 15560-15564.

Bronikowski, M., et al., "Gas-phase production of carbon single-walled nanotubes from carbon monoxide via the HiPco process: a parametric study", J. Vac. Sci. Technol., A, 19(4), 2001, pp. 1800-1805.

Cabria, I., et al., "Metallic and semiconducting narrow carbon nanotubes", Physical Review, B, 67, 2003, pp. 121406-1-121406-4.

Chattopadhyay, D., et al., "A Route for Bulk Separation of Semiconducting from Metallic Single-Wall Carbon Nanotubes", J. Am. Chem. Soc., 2003, vol. 125, pp. 3370-3375.

Chen, Z., et al., "Bulk Separative Enrichment in Metallic or Semiconducting Single-Walled Carbon Nanotubes", Nano Letters, 2003, vol. 3, No. 9, pp. 1245-1249.

Collins, P., et al., "Engineering Carbon Nanotubes and Nanotube Circuits Using Electrical Breakdown", Science, vol. 292, 2001, pp. 706-709.

Frank, S., et al., "Carbon Nanotube Quantum Resistors", Science, 1998, vol. 280, pp. 1744-1746.

Heller, D., et al., "Concomitant Length and Diameter Separation of Single-Walled Carbon Nanotubes", J. Am. Chem. Soc., 2004, vol. 126, pp. 14567-14573.

Kim, W., et al., "Covalent Functionalization of Single-Walled Carbon Nanotubes Alters Their Densities Allowing Electronic and Other Types of Separation", J. Phys. Chem., C, 2008, vol. 112, pp. 7326-7331.

Kim, W., et al., "Selective Functionalization and Free Solution Electrophoresis of Single-Walled Carbon Nanotubes: Separate Enrichment of Metallic and Semiconducting SWNT", Chem. Mater., 2007, vol. 19, pp. 1571-1576.

Krupke, R., et al., "Separation of Metallic from Semiconducting Single-Walled Carbon Nanotubes", Science, 2003, vol. 301, pp. 344-347.

McEuen, P., "Single-wall carbon nanotubes", Physics World, 2000, pp. 31-36.

Nair, N., et al., "A Structure-Reactivity Relationship for Single Walled Carbon Nanotubes Reacting with 4-Hydroxybenzene Diazonium Salt", J. Am. Chem. Soc., 2007, vol. 129, pp. 3946-3954.

Nair, N., et al., "Dynamics of Surgactant-Suspended Single-Walled Carbon Nanotubes in a Centrifugal Field", Langmuir, 2008, vol. 24, pp. 1790-1795.

O'Connell, M., et al., "Band Gap Fluorescence from Individual Single-Walled Carbon Nanotubes", Science, 2002, vol. 297, pp. 593-596.

Peng, H., et al., "Dielectrophoresis Field Flow Fractionation of Single-Walled Carbon Nanotubes", J. Am. Chem. Soc., 2006, vol. 128, pp. 8396-8397.

Reich, S., et al., "Chirality dependence of the density-of-states singularities in carbon nanotubes", Physical Review, 2000, vol. 62, No. 7, pp. 4273-4276.

Smith, W., et al., "A study of aqueous sodium cholate by $^2$H nmr", Can. J. Chem., vol. 59, 1981, pp. 1602-1606.

Strano, H., et al., "Electronic Structure Control of Single-Walled Carbon Nanotube Functionalization", Science, vol. 301, 2003, pp. 1519-1522.

Tans, S., et al., "Electron-electron correlations in carbon nanotubes", Letter to Nature, 1998, vol. 394, pp. 761-764.

Usrey, M., et al., "Evidence for a Two-Step Mechanism in Electronically Selective Single-Walled Carbon Nanotube Reactions", J. Am. Chem. Soc., 2005, vol. 127, pp. 16129-16135.

Zhang, G., et al., "Selective Etching of Metallic Carbon Nanotubes by Gas-Phase Reaction", Science, 2006, vol. 314, pp. 974-977.

International Search Report and Written Opinion from International Patent Application Serial No. PCT/US2008/012980, filed Nov. 21, 2008, mailed May 29, 2009.

Ammon, H. L., et al., "A New Atom/Functional Group Volume Additivity Data Base for the Calculation of the Crystal Densities of C, H, N, O and F-Containing Compounds," Propellants, Explosives, Pyrotechnics, Nov. 1998, vol. 23, pp. 260-265.

Collins, George L., et al., "A method for measuring the charge on small gas bubbles," Journal of Colloid and Interface Science, 1978, vol. 63, pp. 69-75.

Hayter, J. B., et al., "Determination of micelle structure and charge by neutron small-angle scattering," Colloid & Polymer Science, 1983, vol. 261, pp. 1022-1030.

Hennrich, F., et al., "Frequency Dependence of the Dielectrophoretic Separation of Single-Walled Carbon Nanotubes," Journal of Nanoscience and Nanotechnology, 2005, vol. 5, pp. 1166-1171.

Horvàth-Szabò, G., "Apparent Molar Volume of Adsorbed-State Sodium Dodecyl Sulfate on the Polystyrene/Water Interface," Langmuir, 1998, 14 (19), pp. 5539-5545.

Messina, P., et al., "The hydration of sodium dehydrocholate micelles," Colloid & Polymer Science, 2003, vol. 281, pp. 695-698.

Zheng, M., et al., "DNA-assisted dispersion and separation of carbon nanotubes," Nature Materials, 2003, vol. 2, pp. 338-342.

* cited by examiner

SEPARATION OF NANOSTRUCTURES

RELATED APPLICATIONS

This application is a national-stage application under 35 U.S.C. §371 of International Patent Application Serial No. PCT/US08/12980, filed Nov. 21, 2008, entitled "Separation of Nanostructures," by Strano, et al., which application claims the benefit of U.S. Provisional Patent Application Ser. No. 61/004,009, filed Nov. 21, 2007, entitled "Separation of Nanostructures," by Strano, et al., each of which is incorporated herein by reference in its entirety.

FIELD OF THE INVENTION

The present invention generally relates to systems and methods for the separation of nanostructures and, particularly, for the separation of populations of nanostructures from other populations of nanostructures based upon differences in density.

BACKGROUND

A variety of nanostructures have been envisioned for use in industries ranging from structural materials to electronic devices. For example, carbon nanotubes have been highlighted as novel sources for future nano-electronics. Carbon nanotubes may have high aspect ratios with small diameters, $10^3$ times higher electronic current carrying capacity ($10^9$ A/cm$^2$) than that of the noble metals, two times higher thermal conductivity (6600 W/mK) than that of pure diamond, and they may be ballistic conductors at room temperature over many microns. Carbon nanotubes may be either metallic or semiconducting depending on the way in which the graphene sheet is rolled to form the desired nanotube. Both metallic and semiconducting carbon nanotubes have potential for widespread applications, ranging from ultra-low resistance materials, transparent conductors, and electrical interconnects in the case of metallic carbon nanotubes. Semiconducting carbon nanotubes are desired for field-effect transistors applications.

Carbon nanotubes are usually produced by synthetic protocols as mixtures of all electronic types. Therefore, the separation and electronic sorting of carbon nanotubes remains a substantial barrier to widespread electronic and optical applications of these and similar materials.

Accordingly, improved materials and methods are needed.

SUMMARY OF THE INVENTION

The present invention relates generally to the separation of populations of nanostructures from other populations of nanostructures based upon differences in density. The subject matter of the present invention involves, in some cases, interrelated products, alternative solutions to a particular problem, and/or a plurality of different uses of one or more systems and/or articles.

In some embodiments a method for separating nanostructures is described wherein the method comprises providing a plurality of nanostructures, exposing the nanostructures to a diazonium salt such that a first population of the plurality of nanostructures reacts with the diazonium salt and a second population of the plurality of nanostructures does not react with the diazonium salt, and separating the first and second populations based upon a difference in density.

In one set of embodiments, a method for separating nanostructures is described wherein the method comprises exposing a plurality of nanostructures to a set of conditions under which a first population of the plurality of nanostructures is modified in a manner affecting the density of individual members of that population differently than a second population of the plurality of nanostructures, and separating the first and second populations using a centrifuge with a relative centrifugal force of less than about 100,000 g.

In some embodiments, a method for separating nanostructures is described wherein the method comprises exposing a plurality of nanostructures to a set of conditions under which a first population of the plurality of nanostructures is modified such that the average density of the individual members of the first population is at least about 100 kg/m$^3$ greater than the average density of the individual members of a second population of nanostructures, and separating the first and second populations based upon the difference in densities.

In one set of embodiments, a method for separating nanostructures is described wherein the method comprises exposing a plurality of nanostructures to a set of conditions under which a first population of the plurality of nanostructures is modified such that the average density of the individual members of the first population is at least about 10% greater than the average density of the individual members of a second population of nanostructures, and separating the first and second populations based upon the difference in densities.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
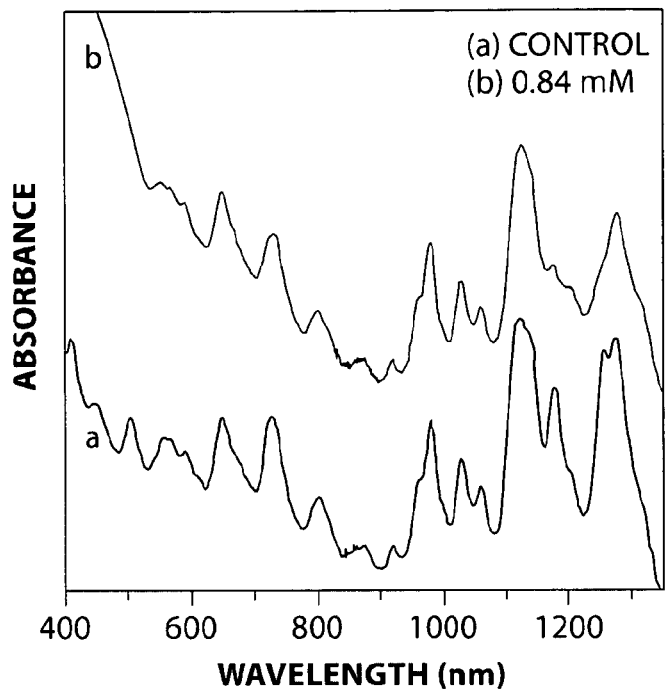
FIG. 1 includes UV-vis-nIR absorption spectra of (a) a control sample and (b) a 0.84 nM reaction sample of functionalized nanostructures, according to one set of embodiments.

The present invention generally relates to the separation of one or more populations of nanostructures from one or more other populations of nanostructures based upon differences in density. An overall mixture of very similar or identical nanostructures may be exposed to a set of conditions under which one population of the nanostructures is affected differently than the other, allowing separating on the basis of differences in density.

Synthetic methods of fabricating nanostructures (e.g., carbon nanotubes) often lead to mixtures with diverse physical and chemical properties (e.g., bandgap, conductivity, etc.). The ability to purify a population of nanostructures based on their properties may be useful in many industries. For example, carbon nanotubes may be useful in producing transparent conductive layers which may be used, for example, in displays (e.g., LCDs, plasma displays, vacuum fluorescent displays, field emission displays, touch panels, etc.), organic light-emitting diodes, antistatic coatings, electrodes of power supplies (e.g., photovoltaic cells, lithium ion batteries, etc.), hydrogen storage units in fuel cells, sensors (e.g., gas and biological sensors), and interconnects in memory devices, among others. The ability to obtain a sample of nanostructures with similar physical or chemical properties may play an important role in the development of such technologies. For example, by separating conductive carbon nanotubes from semi-conductive and non-conductive carbon nanotubes, one could manufacture thinner films with conductivities as high or higher than thicker films made with an unpurified mixture of carbon nanotubes. One of ordinary skill in the art can imagine other applications in which it would be desirable to separate a population of nanostructures from a mixture based on other physical or chemical properties.

In all embodiments described herein, the degree of separation of one population from a different population of a mixture of nanostructures is either made possible at all, or improved after exposure to the conditions described. For example, a mixture of nanostructures may exist in which, inherently, prior to the technique of the invention, separation of one population from another on the basis of differences in density may be effectively impossible or may be possible only to a very small degree. After exposure to the appropriate conditions, the ability to separate one population from another either improves to the point that separation can be carried out in a measurable manner, or improves to the point that one population can be separated effectively entirely from the other. Specifically, in one embodiment, a mixture of nanostructures includes at least two different populations which, prior to exposure to the conditions, can be separated only to no more than about 20% completion. In this context, "completion" means complete separation of one population from another, and X % completion means that only X % of any population of the mixture having a distinct characteristic from the other is separable from the other. However, after exposure to the conditions, in accordance with the invention, separation of the nanostructures on the basis of density can occur to at least 50% completion or, in other embodiments, at least 70%, 80%, 90%, 95%, or greater than 98% completion.

As used herein, the term "nanostructure" refers to articles having a fused network of atomic rings, and at least one cross-sectional dimension of less than about 1 µm, less than about 500 nm, less than about 250 nm, less than about 100 nm, less than about 75 nm, less than about 50 nm, less than about 25 nm, less than about 10 nm, or, in some cases, less than about 1 nm. In some instances, the nanostructures described herein are single molecules. In some embodiments, the nanostructures described herein have a maximum cross-sectional dimension of less than about 1 µm, less than about 500 nm, less than about 250 nm, less than about 100 nm, less than about 75 nm, less than about 50 nm, less than about 25 nm, less than about 10 nm, or, in some cases, less than about 1 nm.

As used herein, the "maximum cross-sectional dimension" refers to the largest distance between two opposed boundaries of an individual structure that may be measured.

In some embodiments, carbon-based nanostructures are described. As used herein, a "carbon-based nanostructure" comprises a fused network of aromatic rings, the network comprising a plurality of double bonds, wherein the nanostructure comprises carbon. In some embodiments, the carbon-based nanostructures may comprise at least about 40%, at least about 50%, at least about 60%, at least about 70%, at least about 80%, at least about 90%, or at least about 95% of carbon by mass, or more. In some instances, the nanostructures have a cylindrical, pseudo-cylindrical, or horn shape. In some embodiments, the carbon-based nanostructure comprises a fused network of at least 10, at least 20, at least 30, at least 40, or, in some cases, at least 50 aromatic rings.

In some cases, the carbon-based nanostructure may comprise an elongated chemical structure having a diameter on the order of nanometers and a length on the order of microns (e.g., tens or microns, hundreds of microns, etc.), resulting in an aspect ratio greater than 10, 100, 1000, 10,000, or greater. In some cases, the nanostructure may have a diameter less than 1 nm, less than 100 nm, 50 nm, less than 25 nm, less than 10 nm, or, in some cases, less than 1 nm. Carbon-based nanostructures may have a cylindrical or pseudo-cylindrical shape, in some cases, such as a carbon nanotube.

The carbon-based nanostructures may be substantially planar or substantially non-planar, or may comprise a planar or non-planar portion. The carbon-based nanostructures may optionally comprise a border at which the fused network terminates. For example, a sheet of graphite is a planar carbon-containing molecule comprising a border at which the fused network terminates, while a carbon nanotube is a non-planar carbon-based nanostructure with borders at either end. In some cases, the border may be substituted with hydrogen atoms. In some cases, the border may be substituted with groups comprising oxygen atoms (e.g., hydroxyl). In other cases, the border may be substituted as described herein. The term "fused network" might not include, for example, a biphenyl group, wherein two phenyl rings are joined by a single bond and are not fused. In some cases, the fused network may substantially comprise carbon atoms. In some cases, the fused network may comprise carbon atoms and heteroatoms. Some examples of carbon-based nanostructures include graphene, carbon nanotubes (e.g., single-walled carbon nanotubes (SWNTs), multi-walled carbon nanotubes (MWNTs)), carbon nanowires, carbon nanoribbons, carbon nanohorns, and the like.

In some embodiments, the nanostructures comprise non-carbon nanotubes. Non-carbon nanotubes may be of any of the shapes and dimensions outlined above with respect to carbon nanotubes. The non-carbon nanotube material may be selected from polymer, ceramic, metal and other suitable materials. For example, the non-carbon nanotube may comprise a metal such as Co, Fe, Ni, Mo, Cu, Au, Ag, Pt, Pd, Al, Zn, or alloys of these metals, among others. In some instances, the non-carbon nanotube may be formed of a semiconductor such as, for example, Si. In some cases, the non-carbon nanotubes may be Group II-VI nanotubes, wherein Group II consists of Zn, Cd, and Hg, and Group VI consists of O, S, Se, Te, and Po. In some embodiments, non-carbon nanotubes may comprise Group III-V nanotubes, wherein Group III consists of B, Al, Ga, In, and Tl, and Group V consists of N, P, As, Sb, and Bi. As a specific example, the non-carbon nanotubes may comprise boron-nitride nanotubes.

In some embodiments, the nanostructures comprise both carbon and another material. For example, in some cases, a multi-walled nanotube may comprise at least one carbon-based wall (e.g., a conventional graphene sheet joined along a vector) and at least one non-carbon wall (e.g., a wall comprising a metal, silicon, boron nitride, etc.). In some embodiments, the carbon-based wall may surround at least one non-carbon wall. In some instances, a non-carbon wall may surround at least one carbon-based wall.

A variety of nanostructures can be separated in accordance with the invention, from mixtures of similar nanostructures. Mixtures of nanotubes, nanowires, nanoparticles, colloidal particles, and the like can be separated according to the technique. The technique finds particular use when the initial mixture includes all like types of nanostructures, e.g., a mixture where all nanostructures are nanotubes, or a mixture where all nanostructures are colloidal particles, or the like. Initially, the mixture, in accordance with the invention, includes at least two populations having a difference in a characteristic rendering them desirably separable from each other. For example, the at least two populations may have a difference in electrical conductivity, redox potential, or the like.

In one set of embodiments, the difference in characteristic is electric conductivity where one population defines a set of semiconducting nanostructures and another population defines a set of nanostructures of conductivity significantly different than semiconducting (i.e., different enough in conductivity, relative to semiconducting, that separation for nanoelectrical use or the like may be desirable). Differences in conductivity between two populations of, for example, nanotubes (e.g., whether a nanotube is metallic, semi-conductive, non-conductive, etc.) may arise due to differences between the chiral angles of the two populations. The chiral angle of a nanostructure (e.g., a nanotube) is a known term in the art. For example, the chiral angle of a nanotube describes the angle between the axis of its hexagonal pattern and the axis of the nanotube. For example, one population may define semiconducting nanostrucures, and another population may define essentially non-electrically conductive nanostructures or a set of conductive (i.e., metallic in character) nanostructures. In any embodiments, the invention provides the ability to select a set of conditions such that the nanostructures of one characteristic are selectively affected, relative to the other, such that that population changes in density to a degree allowing its preferential or total separation from at least one other population, or essentially all other nanostructures.

In some cases, the difference in characteristic may comprise differences in diameter, bandgap, thermal conductivity, yield strength, or chirality, among others.

The methods of modifying nanostructures described herein (e.g., covalent functionalization) may be used to selectively functionalize metallic nanostructures over semiconducting nanostructures over a wide chirality range. In some cases, the methods may be useful in separating populations of nanostructures irrespective of the preparation methods. This high resolution separation efficiency can lead to easier scale-up of the separation process, leading to the bulk production of separated nanostructures.

In some embodiments, the methods described herein may be used to separate nanostructures with differences in chirality. Differences in chiral angles for nanostructures (e.g., carbon nanotubes (single-walled, double-walled, etc.), non-carbon nanotubes, etc.) may lead to differences in electronic structure that may be exploited during selective chemical reaction. In some cases, the differences in chirality between the two populations of nanostructures may be relatively low. For example, in some cases, the difference between the chiral angles of a first and second population of nanostructures may be about 3°. Even though the nanostructures in each population may have small differences in their chiral angles, the effect on the electronic structure may be substantial enough to perform selective chemistry on one versus the other. As a specific example, a (6,6) carbon nanotube has a chiral angle of 30°. A (6,5) carbon nanotube has a chiral wrapping angle of about 27°, but these two nanotubes are different electronically. The former is a metallic nanotube, with electron density near the Dirac point able to form chemical bonds in certain chemical reactions. The latter is a semi-conducting nanotube that has an electronic gap and its ability to form such bonds is inhibited.

In some cases, first and second populations of nanostructures with differences in chiral angles of less than about 45°, less than about 30°, less than about 20°, less than about 15°, less than about 10°, less than about 5°, or less than about 3° may be separated (e.g., via selective functionalization). In some instances, first and second populations of nanostructures with differences in chiral angles of at least about 3°, at least about 5°, at least about 10°, at least about 15°, at least about 20°, at least about 30°, or at least about 45° may be separated (e.g., via selective functionalization).

Those of ordinary skill in the art can use a number of screening techniques to select those conditions best suited for a particular application. For example, if it is desired to separate one population of nanostructures from a mixture, where that population has a particular characteristic (e.g., semiconductive property), then a test can be conducted by exposing only the desirably separated population (e.g., semiconductive nanostructures) from other nanostructures and then, in separate techniques, exposing the first population to the conditions and separately exposing the remainder of the mixture to the conditions. By any of a variety of techniques (spectroscopy, electrical conductivity, or the like) it can be determined whether under the set conditions one population was affected differently than the other, in a manner such that they could be separated from each other to some or a full degree via the invention if first mixed and then exposed to the conditions. Those of ordinary skill in the art of chemistry, materials, electrochemistry, and related fields, can use knowledge readily available to them to pre-select candidate set conditions for this initial screening protocol. As mentioned, a variety of conditions can be used to alter nanostructures to allow separation in accordance with the invention. These can involve covalent attachment of entities, other attachment (ionic, hydrogen bonded attachment, van der Waals attachment, etching, plating, or other treatment), preferentially or selectively, of one population of a set of nanostructures relative to another. For example, in one set of embodiments, 4-hydroxybenzene diazonium salt can be used to separate metallic single-walled carbon nanotubes (SWNT) from semi-conductive SWNT. 4-hydroxybenzene diazonium reagent selectively reacts with metallic SWNT, forming covalent bonds between 4-hydroxy phnyl chemical groups and the metallic SWNT. The addition of 4-hydroxy phnyl groups leads to a change in density of the metallic SWNT, which can then be separated from the un-altered semi-conductive SWNT by density.

Separating one portion from another portion of a plurality of nanostructures based upon difference in density can be carried out in a variety of ways. One technique involves centrifugation. In a typical arrangement involving this technique, an object is put in rotation about an axis, resulting in force applied perpendicular to the axis. Particles with relatively larger densities are physically separated from those with relatively smaller densities in this manner, typically within a sample tube. Optionally, the temperature and pressure of the system can be lowered, and the sample can be spun at very high speeds (e.g. 70,000 RPM) as in the case of ultracentrifugation. Other techniques can include sedimentation, application of an electric field (in the case of like charges), among others.

In some embodiments, it may be advantageous to separate one or more populations of nanostructures using a centrifuge that operates using a relatively low relative centrifugal force. Such centrifuges may be useful, for example, in scaling up the system such that separations may be performed industrially at high volume. Conventional centrifuges, which may employ relatively low relative centrifugal force, are generally less expensive than ultracentrifugation systems. In addition, conventional centrifuges may, in some cases, allow for the handling of larger amounts of material. Centrifuges used in the methods described herein may operate using a relative centrifugal force of less than about 100,000 g, less than about 10,000 g, less than about 1000 g, less than about 100 g, or smaller. In some cases, the centrifuge may operate using an relative centrifugal force of between about 100 g and about 100,000 g, or between about 1000 g and about 10,000 g. In other embodiments, ultracentrifugation may be used to separate one or more populations of nanostructures. In such embodiments, the relative centrifugal force may be at least about 100,000 g, at least about 1,000,000 g, or higher.

It may be advantageous, in some instances, to functionalize a population of nanostructures such that the resulting difference in density is relatively large. Relatively large differences in density may allow for relatively easy separation of the nanostructures (e.g., centrifugation at relatively low relative centrifugal force). In some embodiments, an entity (e.g., a functional group) may be attached to (e.g., covalently bonded to) a first population of nanostructures such that the average density of the individual members of the first population is at least about 100, at least about 150, at least about 250, at least about 500, at least about 750, at least about 1000, or at least about 1500 kg/m$^3$ greater than the average density of the individual members of at least a second population of nanostructures within the mixture. In some cases, an entity may be attached to a first population of nanostructures such that the average density of the individual members of the first population is at least about 10%, at least about 20%, at least about 50%, at least about 100%, at least about 150%, or at least about 200% greater than the average density of the individual members of at least a second population of nanostructures within the mixture.

4-hydroxybenzene diazonium salts may be used to functionalize nanostructures in some embodiments. Any functional groups that may be attached via an electron transfer mechanism may be attached selectively to metallic nanostructures (e.g., metallic single-walled nanotubes). Other examples of functionalizing molecules suitable for use herein (e.g., as part of a diazonium salt) include, but are not limited to, 4-Chlorophenyl; 2,4-Chlorophenyl; 2,4,6-Chlorophenyl; 4-Hydroxyphenyl; 2,4-Hydroxyphenyl; 2,4,6-Hydroxyphenyl; 4-Bromophenyl; 2,4-Bromophenyl; 2,4,6-Bromophenyl; 4-Iodophenyl; 2,4-Iodophenyl; 2,4,6-Iodophenyl; 4-Carboxyphenyl; 4-Methylthiophenyl; 4-Methylenedioxyphenyl; 4-Nitrophenyl; 2,4-Nitrophenyl; 2,4,6-Nitrophenyl; 4-Nitrophenylsulfonylphenyl; 4-Chlorophenylthio; 4-Phenylsulfonylphenyl; 2-Bromo-4-chloro-6-(trifluoromethyl)phenyl; 2-Bromo-4-(trifluoromethoxy)phenyl; 2-Bromo-4-(trifluoromethyl)phenyl; 2-Bromo-5-(trifluoromethyl)phenyl; 2-Bromo-6-chloro-4-(trifluoromethyl)phenyl; 2-Bromo-6-nitro-4-(trifluoromethyl)phenyl; 2-Nitro-4-(trifluoromethyl) phenyl; 2-Nitro-6-(trifluoromethyl)phenyl; 2,4-Bis(methylsulfonyl)phenyl; 2,4-Dinitro-N-(2-hydroxyethyl)phenyl; 2,6-Dinitro-4-(methylsulfonyl)phenyl; 2,6-Dinitro-N-ethyl-4-(methylsulfonyl)phenyl; 2,6-Dinitro-N-ethyl-4-(trifluoromethyl)phenyl; 2,6-Dinitro-N-methyl-4-(methylsulfonyl) phenyl; 2,6-Dinitro-N-methyl-4-(trifluoromethyl)phenyl; 2,6-Dinitro-N-pentyl-4-(trifluoromethyl)phenyl; 2-Chloro-4-(methylsulfonyl)phenyl; DOGS-NTA: 1,2-Dioleoyl-sn-Glycero-3-{[N(5-Amino-1-Carboxypentyl) iminodiAcetic Acid]Succinyl}; Vaska's compound: trans-[IrCl(CO)(PPh$_3$)$_2$] OR trans-chlorocarbonyl1bis (triphenylphosphine)-iridium(I); Wilkinson's compound: [RhCl(PPh$_3$)$_3$]; among others.

In some embodiments, reactions used to functionalize nanotubes may be performed under relatively mild conditions. For example, relatively low temperatures (e.g., below about 100° C.) or relatively mild pH levels (e.g., between about 4.5 and about 9.5, between about 5.5 and about 8.5, etc.) may be employed in some cases. In some instances, functionalization reactions may be performed without the use of a catalyst. Functionalization may also be achieved, in some cases, without the use of ultraviolet radiation.

In some embodiments, density differences between functionalized nanostructures and non-functionalized nanostructures may be enhanced by the attraction of secondary atoms or molecules to the attached functional group (e.g., via van der Waals forces, hydrogen bonds, hydrophobic and/or hydrophilic interactions, ionic bonds, Dipole-dipole bonds, etc.). For example, in some cases, water molecules may be attracted to the selectively attached functional group, enabling more effective separation on the basis of density differences. In some embodiments, a first population of nanostructures may comprise complexes formed between the functionalized nanostructure and a secondary atom or molecule (e.g., water), and a second population may comprise non-functionalized nanostructures, wherein the average density of the individual members of the first population is at least about 100, at least about 150, at least about 250, at least about 500, at least about 750, at least about 1000, or at least about 1500 kg/m$^3$ greater than the average density of the individual members of the second population of nanostructures within the mixture. In some cases, a first population of nanostructures may comprise complexes formed between the functionalized nanostructure and a secondary molecule (e.g., water), and a second population may comprise non-functionalized nanostructures, wherein the average density of the individual members of the first population is at least about 10%, at least about 20%, at least about 50%, at least about 100%, at least about 150%, or at least about 200% greater than the average density of the individual members of the second population of nanostructures within the mixture.

Example 1

In this example, a volume additivity model based upon molecular group contributions that is able to estimate the density difference between carbon nanotubes is described. It was believed that the attachment of chemical ligands to SWNTs could alter their densities to a greater extent than their own intrinsic density distribution. The density difference between functionalized and non-functionalized SWNTs was estimated to investigate if the increase in the density of SWNT by 4-hydroxy phenyl chemical groups was sufficiently large enough to separate functionalized from non-functionalized SWNT by density difference. First, the densities of various (n,m) SWNT in SWNT-surfactant assemblies were calculated.

We calculated the densities of five different SWNT types (i.e., (6,5), (7,6), (8,6), (8,7), and (9,8) SWNTs) with a diameter range from 0.75 to 1.17 nm, as listed in Table 1. The estimated values varied from 1063.6 for (6,5) SWNT to 1087 kg/m$^3$ for (9,8) SWNT, depending on the SWNT diameter. Since the typical diameter distribution of HiPco SWNTs falls into this range (i.e., from 0.75 to 1.17 nm) the density difference of 23.4 kg/m$^3$ among listed HiPco SWNTs was considered the maximum difference expected for HiPco SWNTs. It was believed that, if the density increase of SWNTs by added functional groups was greater than 23.4 kg/m$^3$, then functionalized SWNTs could be separated from non-functionalized SWNTs.

The densities of functionalized SWNT by 4-hydroxy phenyl groups were also calculated for each (n, m) SWNT. The molecular mass and apparent molecular volume (105.3 Angstroms$^3$/molecule) of the 4-hydroxy phenyl group was included in the SWNT-surfactant system to calculate the densities of functionalized SWNTs. The estimated density difference between functionalized and non-functionalized SWNT ranged from 94.2 for (6,5) SWNTs to 103.6 kg/m$^3$ for (9,8) SWNTs, greater than the 23.4 kg/m$^3$, maximum density difference for SWNTs in the 0.75 to 1.17 nm diameter range. Based on these findings, it was concluded that the density increase of SWNTs by the addition of functional groups was large enough for functionalized SWNTs to be separated from non-functionalized SWNTs using density gradient-induced centrifugation.

TABLE 1

Estimated densities of certain non-functionalized and functionalized SWNT.

| (n, m) | Diameter (nm) | Estimated Density (kg/m$^3$) | | |
|---|---|---|---|---|
| | | Nonfunctionalized | Functionalized | Difference |
| (6, 5) | 0.75 | 1063.6 | 1157.8 | 94.2 |
| (7, 6) | 0.89 | 1086.5 | 1182.8 | 96.3 |
| (8, 6) | 0.96 | 1090.3 | 1188 | 97.7 |
| (8, 7) | 1.03 | 1087.4 | 1187.1 | 99.7 |
| (9, 8) | 1.17 | 1087 | 1190.6 | 103.6 |
| Measured Average Density (kg/m$^3$) | | 1089.6 | 1187.5 | 97.9 |

Example 2

In this example, chemical groups were covalently attached to alter the densities of individual SWNTs in a predictable and highly controllable manner. The functionalized SWNTs were then separated from the non-functionalized SWNTs on the basis of differences in densities.

Selective Functionalization.

Functionalized SWNTs were prepared, where only metallic SWNTs were reacted. FIG. 1 shows the UV-vis-nIR absorption spectra of a functionalized SWNT sample, where 0.84 mM reagent solution was injected, together with non-functionalized SWNTs (control) as a reference. When 0.84 mM reagent solution was injected (FIG. 1B), the peak intensities representing the first Van Hove transition of metallic species ($E_{11}^M$, 485-620 nm) decreased when compared to those of non-functionalized SWNT (control, FIG. 1A), while the peak intensities representing the second ($E_{22}^S$, 620-900 nm) and first ($E_{11}^S$, 900-1350 nm) Van Hove transition of the semi-conducting species changed insignificantly. These results indicated that metallic SWNTs selectively reacted with reagents while semi-conducting SWNTs did not.

Separation of Functionalized from Non-Functionalized SWNT.

Figure 2:
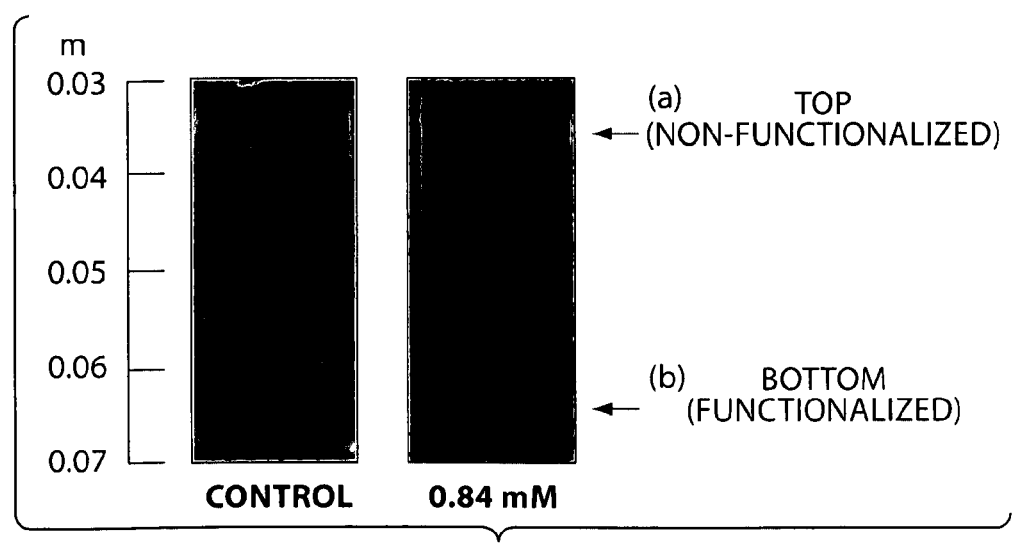
FIG. 2 includes photographs of centrifuge tubes after centrifugation, according to one set of embodiments.

The functionalized SWNTs (prepared in the previous section) and the control were centrifuged for 22 hrs in the density gradient solution. The images of the centrifuge tubes of these samples after centrifugation are presented in FIG. 2. Injected SWNTs were separated into two distinct fractions after centrifugation of the reacted sample: one fraction was close to the top of the gradient solution ((a) in FIG. 2) and one fraction was close to the bottom of the gradient solution ((b) in FIG. 2). Based upon the absence of a higher density fraction in the control, we assigned the bottom band to fully 4-hydroxy phenylated SWNTs.

Figure 3:
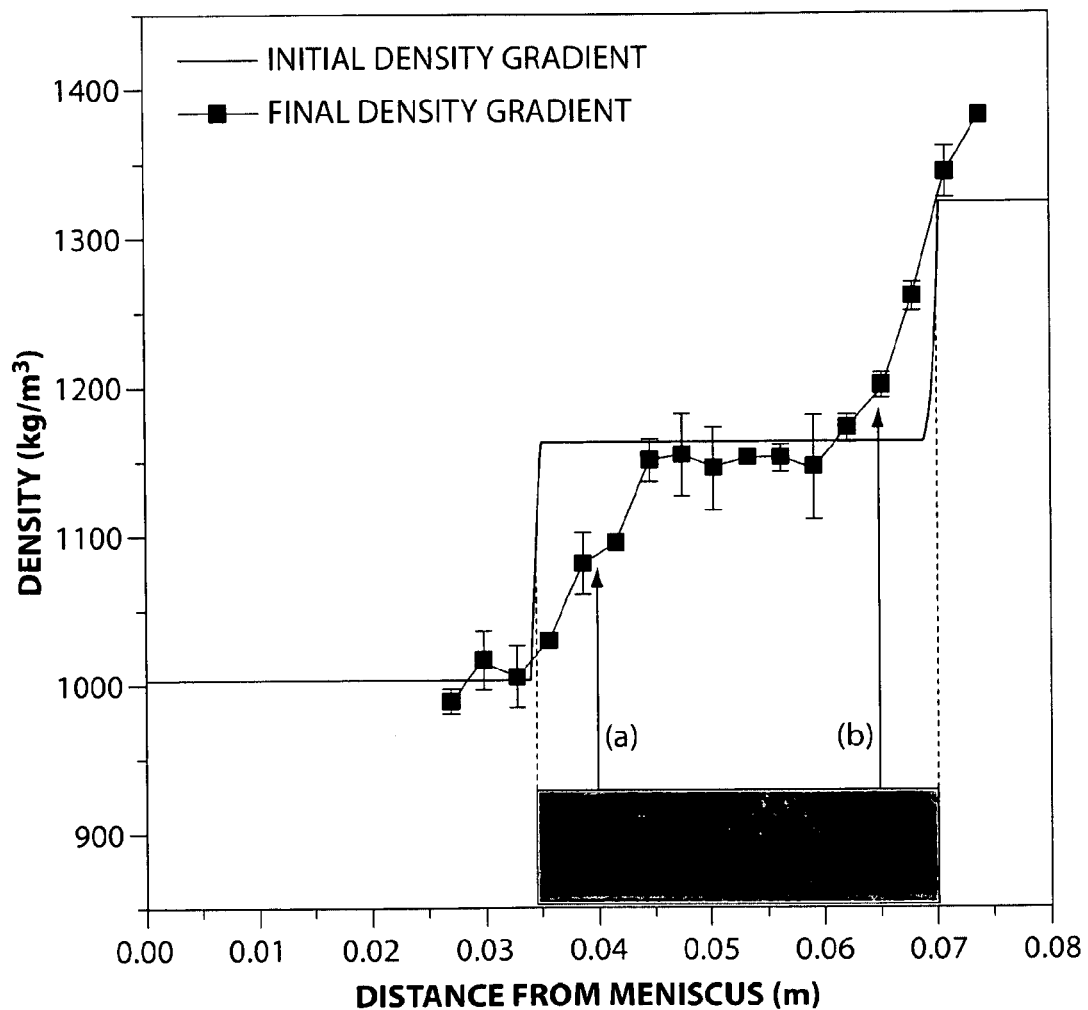
FIG. 3 is, according to one set of embodiments, a plot of density measurement of functionalized and non-functionalized nanostructures.

To verify that the density of SWNTs collected at the bottom was similar to the value estimated for the functionalized SWNTs in the previous section, actual densities of top and bottom SWNTs were measured and compared with the estimated values in the case of the 0.84 mM reaction sample. The result is shown in FIG. 3. The inset in FIG. 3 is a picture of the 0.84 mM reaction sample after centrifugation (same as that in FIG. 2). The average densities of the top and bottom fractions were calculated by matching the distance of each fraction from the meniscus with the final density of the solution. The average measured densities for these fractions were 1089.6 and 1187.5 kg/m$^3$ (the average estimated values for these fractions were 1082.9 and 1181.3 kg/m$^3$), respectively. Thus, the density difference between these two fractions was 97.9 kg/m$^3$, which was comparable to the calculated average density difference of 98.3 kg/m$^3$. This close agreement (within an error range of less than 1%) suggested that the bottom fraction included the functionalized SWNTs, and the top fraction included the non-functionalized SWNTs.

Figure 4:
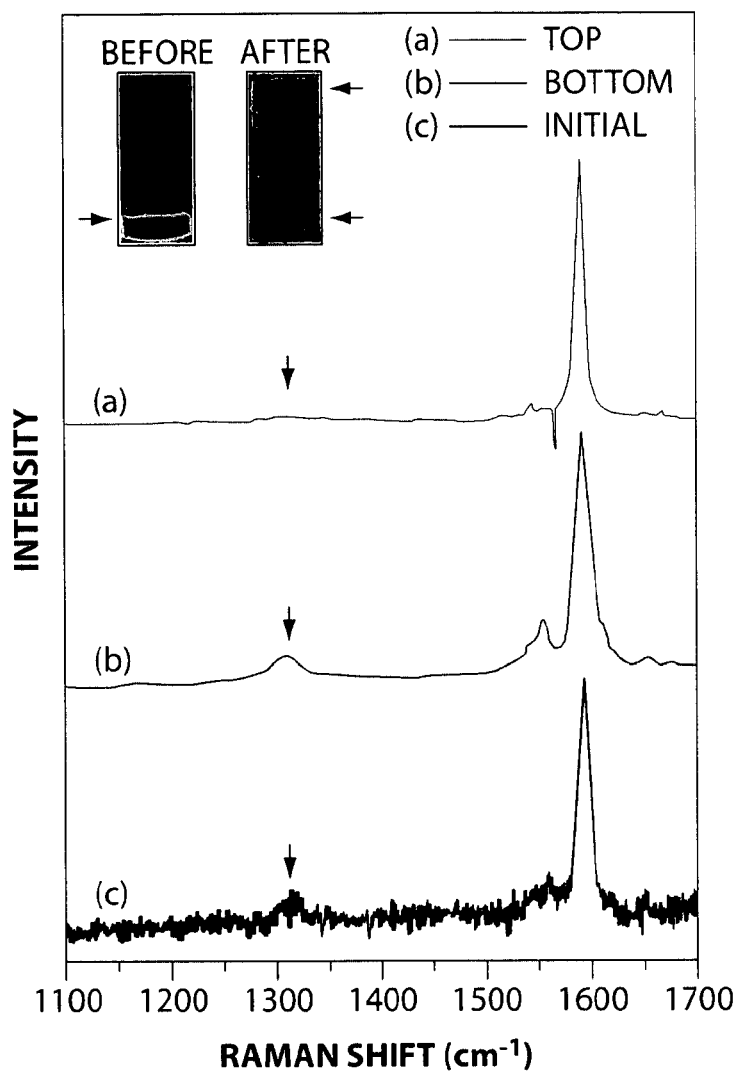
FIG. 4 includes plots of Raman measurements of nanostructures, according to one set of embodiments.

We performed Raman measurements for the separated fractions to spectroscopically investigate the separation efficiency and the purity. First, we tracked the disorder mode (D peak, 1305 cm$^{-1}$) and tangential mode (G peak, 1592 cm$^{-1}$) of all separated fractions using 632.8 nm excitation to investigate the extent of functionalization in each fraction, and showed the results in FIG. 4, together with the data of each initial SWNT sample before separation. The insets in FIG. 4 show the images of centrifuge tubes of SWNT samples before and after separation. After separation, the intensity of the D peak at the bottom fraction (line b) is increased, and that at the top fraction (line a) is decreased, compared to that of the initial reaction sample. This indicates that the functionalized SWNTs are separated from mixtures and collected at the bottom, while the non-functionalized SWNTs are separated and collected at the top. The measurements are consistent with a separation based on the increased density caused by covalent attachment of the 4-hydroxy phenyl chemical group.

It should be noted that this method also allows independent measurement of the (n,m) chemical conversion of a functionalized carbon nanotube. This may allow more rigorous analysis of SWNT chemistry that is less reliant upon un-calibrated spectroscopies such as Raman or photoluminescence.

Reaction Scheme for Selective Functionalization

The reagents needed for this reaction were SWNTs and diazonium salts. HiPco SWNTs, individually suspended in either 1 wt % sodium dodecyl sulfate (SDS) or 2 wt % sodium cholate (SC), were used with SWNT concentrations of about 0.005 to about 0.02 wt %. Any types of diazonium salts, which react with SWNTs via an electron transfer mechanism, can selectively functionalize metallic SWNTs over semiconducting SWNTs. 4-hydroxy, 4-chloro, 4-nitro benzene diazonium salts were tested, and all of these reagents worked. The reaction was performed at 45° C. and pH 5.5 by injecting the diazonium salt solution into a reactor vessel containing SWNTs using a syringe pump (Cole-Parmer). The total volume of 500 µl of the diazonium solution, with concentrations described below, was added at an injection rate of 41.66 µl/h into the total volume of about 5 to about 35 ml of SWNT solution. The reactor was well-stirred throughout the reaction time of 12 hours. Selectivity for metallic SWNT was observed to the near exclusion of semiconducting SWNT when the concentration of diazonium salt was about 0.28 mM for SDS and about 0.84 mM for SC (in the case of 5 ml of SWNT and 4-hydroxy benzene diazonium solution. When the SWNT solution volume was increased, highly concentrated diazonium solution may be used).

Example 3

Theoretical calculations were performed to determine functional groups that may be used to produce carbon nanotubes with large differences in density. A non-limiting group of proposed functional groups is outlined in Table 2 below. Table 2 includes the densities of the functionalized carbon nanotubes as well as the amount of time needed to achieve separation of the functionalized nanotubes at a centrifuge rotor speed of $10^5$ rpm.

TABLE 2

Proposed molecules for use in selective functionalization of nanostructures.

| Proposed Molecule | Density (kg/m$^3$) | Centrifuge Time (min) at a Rotor Speed of $10^5$ rpm |
|---|---|---|
| Mono-bromo-phenyl diazonium | ~1350 | 18 |
| Di-bromo-phenyl diazonium | ~1560 | 12 |
| Tri-bromo-phenyl diazonium | ~1740 | 6 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for separating nanostructures, comprising:
providing a plurality of nanostructures;
exposing the nanostructures to a diazonium salt such that a first population of the plurality of nanostructures reacts with the diazonium salt and a second population of the plurality of nanostructures does not react with the diazonium salt;

separating the first and second populations based upon a difference in density.

2. A method for separating nanostructures, comprising:

exposing a plurality of nanostructures to a set of conditions under which a first population of the plurality of nanostructures is modified in a manner affecting the density of individual members of that population differently than a second population of the plurality of nanostructures; and separating the first and second populations using a centrifuge with a relative centrifugal force of less than about 100,000 g.

3. A method for separating nanostructures, comprising:

exposing a plurality of nanostructures to a set of conditions under which a first population of the plurality of nanostructures is modified such that the average density of the individual members of the first population is at least about 100 kg/m$^3$ greater than the average density of the individual members of a second population of nanostructures; and separating the first and second populations based upon the difference in densities.

4. A method for separating nanostructures, comprising:

exposing a plurality of nanostructures to a set of conditions under which a first population of the plurality of nanostructures is modified such that the average density of the individual members of the first population is at least about 10% greater than the average density of the individual members of a second population of nanostructures; and separating the first and second populations based upon the difference in densities.

5. A method as in claim 1, wherein separating the first and second populations comprises using a centrifuge with a relative centrifugal force of less than about 100,000 g.

6. A method as in claim 2, wherein modifying the first population comprises attaching entities to the nanostructures within the first population.

7. A method as in claim 2, wherein modifying the first population comprises covalently attaching entities to the nanostructures within the first population.

8. A method as in claim 2, wherein modifying the first population comprises covalently attaching a diazonium salt to the nanostructures within the first population.

9. A method as in claim 1, wherein the first population comprises metallic nanostructures.

10. A method as in claim 1, wherein the second population comprises semiconductive nanostructures or non-conductive nanostructures.

11. A method as in claim 1, wherein the first and second populations comprise nanostructures with different chiral angles, nanostructures with different diameters, nanostructures with different thermal conductivities, or nanostructures with different bandgaps.

12. A method as in claim 1, wherein the difference in chiral angles of nanostructures within the first and second populations is about 3°.

13. A method as in claim 1, wherein the nanostructures comprise carbon-based nanostructures, multi-walled nanotubes comprising at least one carbon-based wall and at least one non-carbon wall, non-carbon nanotubes, or nanotubes comprising a metal.

14. A method as in claim 1, wherein the nanostructures comprise carbon nanotubes, graphene, carbon nanohorns, or carbon nanowires.

15. A method as in claim 1, wherein the nanostructures comprise single-walled carbon nanotubes or multi-walled carbon nanotubes.

16. A method as in claim 1, wherein the nanostructures comprise Group II-VI nanotubes or Group III-V nanotubes.

17. A method as in claim 1, wherein a first population of the plurality of nanostructures is modified such that the average density of the individual members of the first population is at least about 150 kg/m$^3$ greater than the average density of the individual members of a second population of nanostructures.

18. A method as in claim 1, wherein a first population of the plurality of nanostructures is modified such that the average density of the individual members of the first population is at least about 10% greater than the average density of the individual members of a second population of nanostructures.

19. A method as in claim 1, wherein separating the first and second populations comprises separating to at least 50% completion.

* * * * *